Sept. 21, 1948.   I. R. HUBBARD   2,449,700
FISH LURE
Filed Aug. 9, 1943

Inventor
IRVIN R. HUBBARD

By Wilfred E. Lawson
Attorney

Patented Sept. 21, 1948

2,449,700

UNITED STATES PATENT OFFICE 2,449,700

FISH LURE

Irvin R. Hubbard, Beaver Dam, Wis., assignor, by decree of court, to Harriette E. Hubbard Application August 9, 1943, Serial No. 497,987

5 Claims. (Cl. 43—46)

This invention relates generally to the class of fishing and trapping and pertains particularly to improvements in artificial lures.

A principal object of the present invention is to provide a new and novel type of surface lure which is designed to create an intermittent popping sound as it is drawn over the surface of the water and which is so designed that in addition to forming the stated popping sound it will leave the water smoothly and without creating an unnecessary amount of drag on the fishing line to which it is attached, by reason of the retention of water in the hollow or depressed face thereof, such hollow or depressed face being so formed that the water will readily drain downwardly and rearwardly therefrom.

Another object of the invention is to provide a new and novel type of surface lure of weedless form, without the employment of the usual wires which are employed for fending weeds away from the hooks, in the usual type of weedless lure.

Another object of the invention is to provide a weedless surface lure having a group of relatively stiff bristles, or a brush of bristles, extending downwardly therefrom to function in fending off weeds and causing the lure and the trailing hooks to ride over the weeds or other floating matter in the water whereby the hooks can be repeatedly cast and retrieved in water having thick vegetation growing therein, without becoming fouled.

The invention will be best understood from a consideration of the following detailed description taken in connection with the accompanying drawings, with the understanding that minor changes may be made in the construction of the device so long as such minor changes do not depart from the spirit of the invention as expressed in the appended claims.

Figure 1:
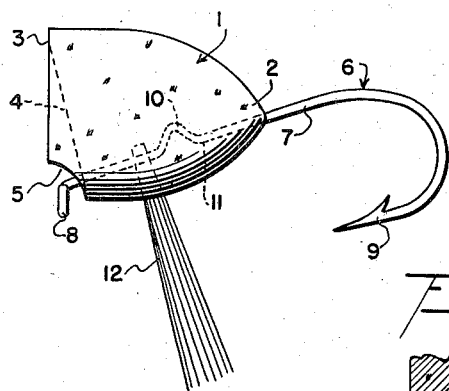
Figure 1 is a view in side elevation of the unfinished body of the lure showing the hook and weed guard attached thereto.
Figure 2:
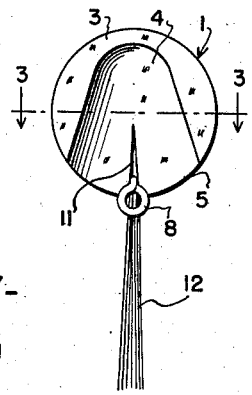
Figure 2 is a view in front elevation of the same.

Referring now more particularly to the drawings it will be seen upon reference to Figures 1 and 2 particularly that the body of the lure, is of a length somewhat greater than its diameter and is preferably substantially cylindrical through the front half of its length, being gradually tapered off to a rounded or slightly pointed tail, which tail portion is indicated generally by the numeral 2. This body 1 of the lure is formed of a suitable buoyant material such as cork or the like and the front or forward end 3 is in a plane perpendicular to the axis of the body as shown.

Figure 3:
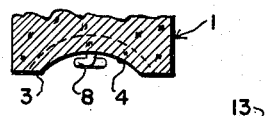
Figure 3 is a partial section taken on the line 3—3 of Figure 2.
Figure 4:
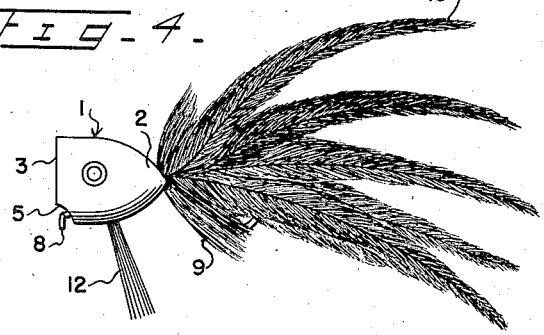
Figure 4 is a view in side elevation of the lure in its complete or final form.

The forward face or front of the lure body is cut out or channeled from near the top of the face downwardly and rearwardly, such channeled or hollowed face, which is indicated at 4, being substantially arcuate transversely as shown in Figure 3.

By reason of the extension of the channeled portion 4 of the face downwardly and rearwardly as is clearly shown in dotted lines in Figure 1, through the body which is circular, the lower part of the forward end of the body is cut away transversely as indicated at 5. This cut out lure front portion 5 is slightly arcuate as shown and, with the recessed face 4, functions to produce the desired popping sound when the lure is drawn over the surface of the water.

The numeral 6 generally designates the hook, the shank portion of which is indicated at 7, the eye at 8, and the hook part proper or point at 9. The shank portion 7 of the hook is provided with the usual hump 10 found in hooks of this type which are used in the manufacture of lures.

The hook is mounted in the body 1 of the lure by forming a suitable longitudinal slit 11 longitudinally of the body from the bottom or under side thereof and the shank of the hook is then inserted in this slit and the slit is suitably closed by means of glue or in any other suitable manner.

Figure 5:
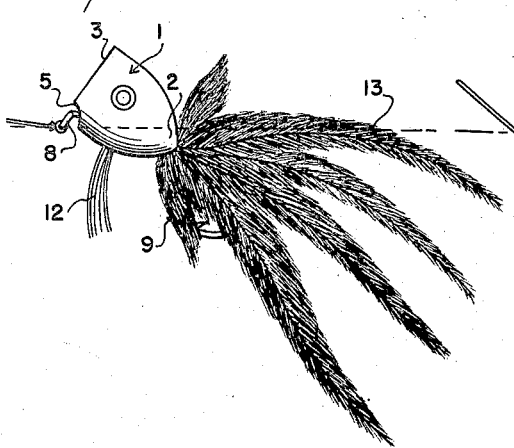
Figure 5 is a view illustrating the natural position of the lure on the surface of the water.
Figure 6:
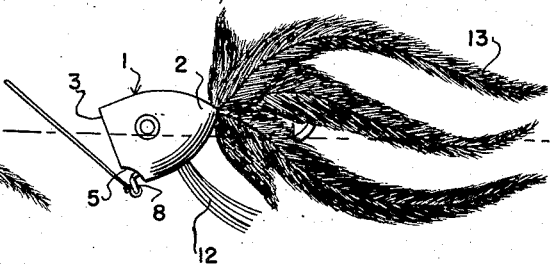
Figure 6 illustrates the position assumed by the lure when jerked forwardly.

In accordance with the present invention the hook is placed in the slit so that the shank portion of the hook is disposed at an acute angle to the longitudinal center of the body 1, the rear end of the hook issuing from the rear end of the body at the longitudinal center of the body while the forward end of the hook extends from the body at the lower end or bottom of the channeled face 4. Also as is readily seen in Figure 1 the eye 8 of the hook is in the plane of or extends slightly below the bottom portion of the body and is disposed behind the plane of the face 3 in the cut out area 5. Thus when the body 1 is held horizontally the hook will extend upwardly and rearwardly at a sharp inclination but when the lure is floating on the surface of the water the forward end of the body will be raised and the point or barb of the hook will be well below the surface as shown in Figure 5.

In assembling the body of the lure there is applied to the shank of the hook just in front of the hump 10 a bunch or sheaf of relatively stiff bristles 12. The upper ends of the bristles are, of course, secured with the shank of the hook, in the slit 11 and the bristles protrude from the bottom of the body in a relatively round or circular bunch or sheaf and extend downwardly a substantial distance, opening or flaring out slightly at their free ends as shown. As will be readily apparent this sheaf of bristles is disposed directly in front of and in the vertical plane of the barbed tip or point 9 of the hook so that as the lure is drawn through the water or along the surface of the water the bristles, which will be softened slightly after being soaked in the water, will curve backwardly and if a leaf or branch of a plant or other object lies in the path of the bristles and of the point of the hook, the bristles will ride over such object, being further bent rearwardly toward the point of the hook so as to substantially cover or shield the point and at the same time raising the body of the lure so that the hook will be made to ride over the obstruction.

The tail hackle is attached in a suitable manner at the rounded rear end portion 2 of the body, where the shank of the hook emerges, and is generally designated 13. As shown, the hackle is preferably of suitable size to envelop the hook so that as the lure is floating on the water the hook will be substantially hidden.

The present improved lure has the features of being entirely weedless for all types of fishing without employing the usual wires for this purpose; it is of materially less weight than other lures of the same type and size; it is easier to cast; and more buoyant than lures of corresponding size; it will produce more sound or popping noise when jerked over the surface of the water, and because of the manner in which the forward end or face of the lure is cut out it is much more easily picked up because water in the hollow face is free to flow downwardly and outwardly therefrom, thereby producing less strain on the line and rod.

By the use of relatively stiff bristles in the manner illustrated and described the weight of metal buffers or guards is eliminated, without reducing the efficiency of the weed fending feature and at the same time the bristles will yield more readily than steel wires when the lure is taken by fish so that the possibility of the weed fending element of the lure preventing the lure from being properly taken by a fish is avoided.

I claim:

1. A fishing lure comprising an elongated body of buoyant material, the body having a front end face in a plane perpendicular to its length, said front face having a straight downwardly and rearwardly extending channel which is continued through the side of the body; and a hook having the shank portion embedded in the body and extending lengthwise thereof from the lower end of said channel upwardly and rearwardly through the opposite end of the body at substantially the longitudinal center of the body, said shank having an eye at the forward end.

2. A fishing lure as set forth in claim 1, in which the eye of the hooked shank lies behind the plane of the forward face of the lure body and is disposed substantially in the plane of the side of the body at the lower end of said channel.

3. A fishing lure as set forth in claim 1, having a weed deflecting means extending downwardly from the under side of the body of the lure in a position in advance of, spaced from, and in the vertical plane of the point of, the hook and comprising a single relatively long compact sheaf of relatively stiff bristles.

4. A fishing lure comprising a relatively long substantially cylindrical body of buoyant material having a forward end face in a plane substantially perpendicular to the longitudinal axis of the body and having the rear end of the body tapered off to a rounded point, said forward end face having a channel cut therein from a point adjacent the top of the body downwardly and rearwardly to extend through the side of the body, said channel being transversely arcuate, the extension of the channel downwardly and rearwardly opening the sides of the channel adjacent its lower end, and a hook having a shank portion embedded in the body of the lure and extending from the face of the channel at its lower end obliquely through the length of the body to emerge from the rear end at substantially the axial center of the body, the point of the hook being downward, the hook at its forward end having an eye lying within the channel and behind the plane of the forward end face of the body.

5. A fishing lure comprising a body of buoyant material having a circular cross section through the major portion of its length and tapering through approximately half its length to a blunt point, the opposite end of the body from said blunt point having a surface transversely perpendicular to the axis, a hook having a shank of a length greater than the length of the body, said hook shank being embedded in the body to extend obliquely to the axis of the body, the hook shank terminating in an eye disposed adjacent to the side of the body at the said opposite end thereof, the shank emerging from the pointed end of the body at the axial center and extending rearwardly, and the point of the hook being disposed rearwardly of the point of the body, the point of the hook and the eye being upon the same side of the axial center of the body, and a relatively long compact sheaf of relatively stiff bristles attached to the portion of the hook shank which is embedded in the body and extending outwardly from the shank to lie in advance of and across the line of the point of the hook.

IRVIN R. HUBBARD.

REFERENCES CITED

The following references are of record in the file of this patent:

UNITED STATES PATENTS

| Number | Name | Date |
| --- | --- | --- |
| 1,582,716 | Wilder | Apr. 27, 1926 |
| 1,884,053 | McGarraugh | Oct. 25, 1932 |
| 1,900,832 | Martin | Mar. 7, 1933 |
| 2,038,940 | Knill | Apr. 28, 1936 |
| 2,112,180 | Stoddard | Mar. 22, 1938 |
| 2,242,708 | Lancaster | May 20, 1941 |
| 2,258,080 | Thomas et al. | Oct. 7, 1941 |